Sept. 23, 1930.  C. C. FARMER  1,776,282
MAGNETIC BRAKE DEVICE
Filed March 2, 1928
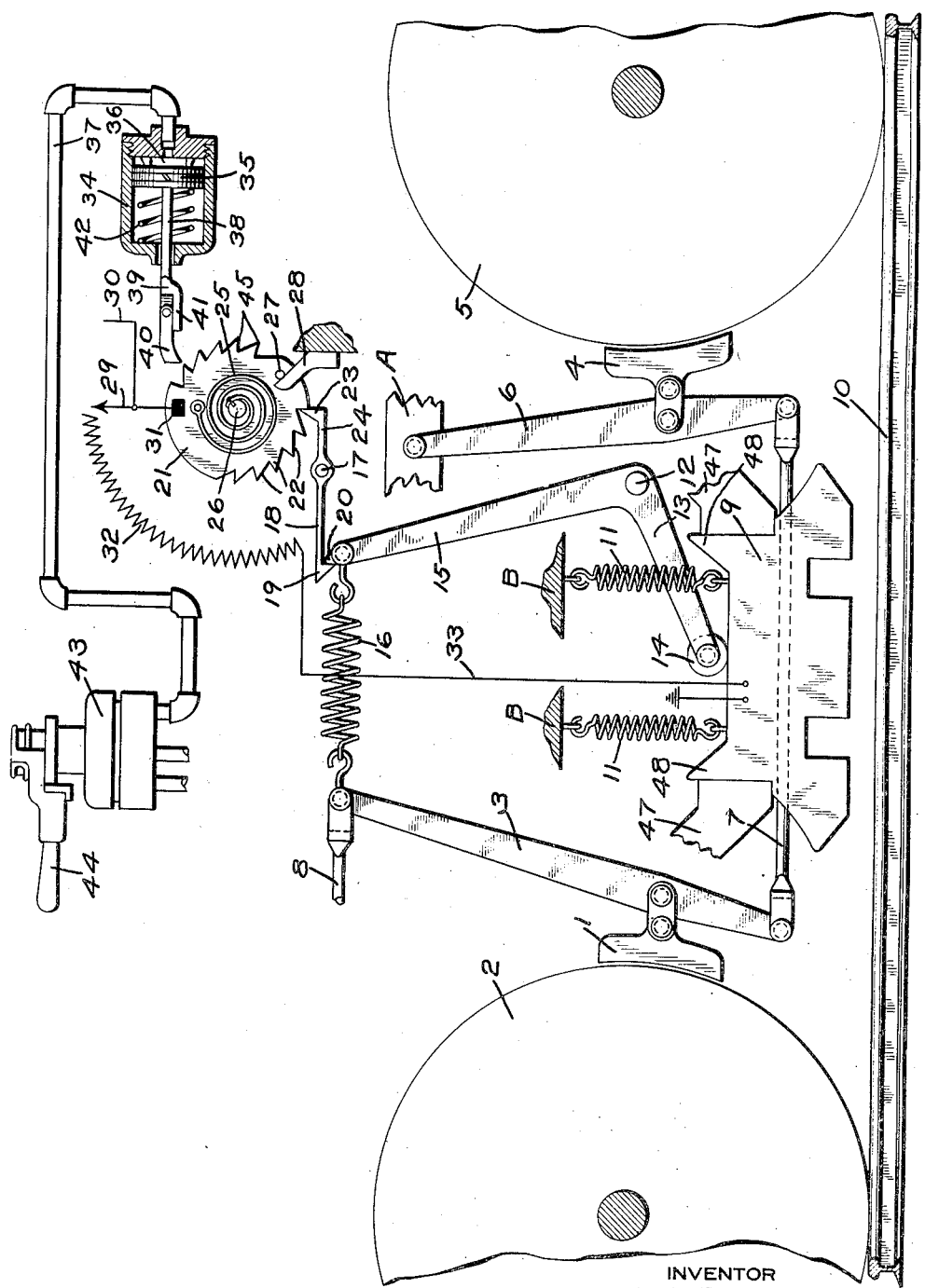
INVENTOR
CLYDE C. FARMER
BY Wm. M. Cady
ATTORNEY Patented Sept. 23, 1930

1,776,282

UNITED STATES PATENT OFFICE

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

MAGNETIC BRAKE DEVICE

Application filed March 2, 1928. Serial No. 258,483.

This invention relates to magnetic brakes of the type having magnetic brake shoes adapted to engage the rails and to retard the vehicle by the drag of the brake shoe on the rail due to the magnetic pull between the brake shoe and the rail.

The principal object of my invention is to provide a magnetic brake of the above type having means whereby an operator may at will graduate the magnetic force of the brake shoe.

In the accompanying drawing, the single figure is a diagrammatic view of a combined magnetic and fluid pressure brake apparatus embodying my invention.

As shown in the drawing, the fluid pressure brake may comprise a brake shoe 1 adapted to engage a vehicle wheel 2 and carried by the usual brake beam (not shown) which also carries another brake shoe adapted to engage the other wheel of the pair of wheels, the brake beam being operatively connected to a live brake lever 3. A brake shoe 4 is adapted to engage wheel 5 and is carried by a brake beam (not shown) which also carries a brake shoe adapted to engage the other wheel of the pair of wheels, the brake beam being operatively connected to a dead brake lever 6. The levers 3 and 6 are connected by a rod 7 and the dead lever 6 is fulcrumed on a portion A of the car truck. The live lever 3 is connected at its free end to a pull rod 8, which rod is operatively connected to the usual brake cylinder (not shown).

A magnetic brake shoe 9 is provided for engagement with the rail 10, a similar brake shoe being provided for engagement with the other rail (not shown).

Each brake shoe 9 is suspended above the rails by coil springs 11 which are secured at one end to a portion B of the car truck.

A bell crank is fulcrumed on a pin 12 carried by the car truck and at the end of the arm 13 of the bell crank, a roller 14 is provided, which is adapted to engage the upper face of the brake shoe 9. The end of the other arm 15 of the bell crank is connected by a coil spring 16 with the upper end of the live lever 3.

A latch lever is fulcrumed on a pin 17 and one arm 18 of the lever is provided at its end with a latch 19 adapted to engage a projection 20 carried at the end of the arm 15.

A rotatable ratchet wheel 21 is provided, having a plurality of teeth 22 adapted to be engaged by a pawl 23 carried at the end of the other arm 24 of the latch lever.

A spiral spring 25 is carried by the wheel 21 and has one end secured to the wheel and the other end to the axle pin 26. The spring is so wound that the force of the spring tends to rotate the wheel in a clockwise direction as limited by engagement of pin 27 with a stop member 28.

Rotatable with the ratchet wheel 21 is a contact arm 29 connected to a current supply wire 30 and insulated from the wheel 21 by a section of insulation 31. The arm 29 is adapted to contact with a variable resistance coil 32 which is connected at one end to a wire 33, leading to the energizing coils (not shown) of the magnetic brake shoe 9.

The wheel 21 is adapted to be rotated by the operation of a reciprocating pawl mechanism comprising a cylinder 34 containing a piston 35 having the chamber 36 at one side connected to a pipe 37 and provided at the opposite side with a stem 38. The outer end of the stem 38 is provided with an enlarged portion 39 to which a pawl 40 is pivotally connected, downward movement of the pawl 40 being limited by engagement with a ledge 41 of the portion 39. A coil spring 42 in cylinder 34 urges piston 35 toward the right to the position shown in the drawing.

The pipe 37 is connected to a hand operated controlling valve device 43 which is preferably the brake valve device usually employed for controlling the fluid pressure brakes and being provided with an operating handle 44.

When the piston 35 is shifted to the left, the pawl 40 is also shifted so as to engage one of a plurality of teeth 45 carried by the ratchet wheel 21.

The brake valve device 43 has the usual positions for controlling the fluid pressure brake and an additional position, which may be termed the magnetic service position, and in which fluid under pressure is supplied through pipe 37 to the cylinder 34.

In order to apply the brakes, the brake valve handle 44 is turned to the usual pneumatic brake service position, in which fluid under pressure is supplied to the brake cylinder, either directly, or by effecting a reduction in pressure in the usual brake pipe (not shown), so as to cause the usual triple valve device (not shown) to effect the supply of fluid under pressure to the brake cylinder.

The pull rod 8 is then operated to cause the live lever 3 to press the brake shoe 1 into engagement with the wheel 2 and through the rod 7 and the dead lever 6 to press the brake shoe 4 into engagement with the wheel 4, so that the fluid pressure brakes are applied.

In this movement of the live lever 3 to apply the brakes, the spring 16 is placed under tension, but is prevented from moving the arm 15 of the bell crank by the engagement of the latch 19 with the projection 20.

If it is now desired to apply the magnetic brake, the brake valve handle is turned to magnetic service position, in which fluid under pressure is supplied through pipe 37 to piston 35. The piston 35 is then shifted to the left, causing the pawl 40 to engage a tooth 45 of the ratchet wheel 21 and thereby the wheel 21 is rotated a distance corresponding with one tooth. The rotation of wheel 21 causes the contact arm 29 to engage a portion of the resistance coil 32, so that a circuit is completed from the current supply wire 30 through the resistance coil 32 to the wire 33. The coils of the magnetic brake shoe 9 are thus energized. The rotation of wheel 21 also causes the pawl 23 to ride over an adjacent tooth 22 of the ratchet wheel and the movement of the latch lever which is thus effected, causing the latch 19 to disengage from the projection 20. The spring 16 having previously been placed under tension by the application of the fluid pressure brakes, the arm 15 of the bell crank is pulled to the left by the spring 16 and thereby the arm 13 is moved so that the roller 14 operates to press the brake shoe 9 into engagement with the rail 10.

The magnetic brake shoe 9 having been energized as above described, when the brake shoe is brought into engagement with the rail, the magnetic pull exerted between the brake shoe and the rail causes a drag of the brake shoe on the rail and a corresponding retarding action on the movement of the vehicle.

If it is desired to apply the magnetic brakes with greater force, the brake valve handle is first turned to a position in which fluid under pressure is vented from piston 35 and then back to the magnetic service position, in which fluid under pressure is supplied to piston 35. When fluid is vented from piston 35, the spring 42 shifts the piston 35 and the pawl 40 to the position shown in the drawing, the pawl 23 engaging a tooth 22 of the wheel so as to prevent movement of the wheel by the spring 25.

When fluid under pressure is again admitted to piston 35, the piston 35 is again moved to the left, causing the pawl 40 to engage another tooth 45 of the wheel and thus effect the rotation of the wheel to the extent of another tooth. The contact arm is then shifted to cut out some of the resistance of the coil 32 in the magnetic brake circuit, so that the current supply to the coils of the magnetic brake shoe 9 is increased and consequently the magnetic pull of the brake shoe is correspondingly increased. The above operation may be repeated as desired to further increase the magnetic pull of the brake shoe.

When the brake valve handle 44 is turned to release position, to effect the release of the brakes, the brake lever 3 is moved back to release position and the tension on spring 16 is relieved, so that the springs 11 act to pull the brake shoe 9 out of engagement with the rail 9 and at the same time, the bell crank is shifted by the upward movement of the brake shoe, so that the projection 20 engages the inclined outer face of the latch 19. The latch 19 is then lifted, causing the pawl 23 to be tripped out of engagement with a tooth 22 of the wheel 21, so that the ratchet wheel is returned to the position shown in the drawing by the action of the spring 25. The circuit of the magnetic brake shoe is therefore opened, so that the magnetic brake shoe becomes deenergized. After the projection 20 passes the latch 19, said latch drops back into engagement with the projection 20, locking the bell crank arm 15 against movement, as shown in the drawing.

In order to maintain the brake shoe 9 against relative longitudinal movement with respect to the car, vertical guiding means may be provided comprising guide members 47 carried by the car truck and having vertical guide faces adapted to engage corresponding faces of guide portions 48 carried by the brake shoe 9.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a magnetic rail brake shoe, of means operated by variations in fluid pressure for varying the current supplied to said shoe and manually operable means for controlling the fluid pressure on said varying means and for separately controlling the fluid pressure for operating the fluid pressure brakes.

2. The combination with a magnetic brake shoe, of a variable resistance in the energizing circuit of said shoe, a rotatable device, rotatable to vary the amount of said variable resitance in said circuit, a fluid pressure operated device for actuating said rotatable device, and a manually controlled valve for controlling the fluid pressure on said fluid pressure operated device and for separately controlling the fluid pressure for operating the fluid pressure brakes.

3. The combination with a magnetic brake shoe, of a resistance coil connected to the energizing circuit of said shoe, a ratchet wheel having a contact arm for varying the amount of said resistance coil in said circuit, a pawl device for operating said wheel, and a manually operated valve for controlling the fluid pressure for operating said pawl device.

4. The combination with a magnetic brake, of a brake valve device having one position for effecting a pneumatic application of the brakes and another position for effecting an application of the brakes by operation of said magnetic brake.

5. The combination with a magnetic brake shoe, of means for varying the current for energizing said shoe, a ratchet wheel rotatable to control said means, a fluid pressure operated pawl device for engaging the teeth of said wheel, and a manually operable valve for controlling the fluid pressure for operating said pawl device.

6. The combination with a magnetic brake shoe, of means for varying the current for energizing said shoe, a toothed wheel rotatable to effect the operation of said means, a pawl device operable to engage a tooth of said wheel and rotate said wheel, a spring for opposing movement of said wheel by said pawl device, and a locking pawl for engaging a tooth of said wheel to prevent movement of said wheel by said spring.

7. The combination with a magnetic brake shoe normally held suspended above the rail and a fluid pressure brake, of means operable upon applying the fluid pressure brakes for moving the magnetic brake shoe into engagement with the rail, a latch device for preventing the operation of said means, and manually operable means for tripping said latch device and for effecting the energization of said brake shoe.

8. The combination with a magnetic brake shoe normally held suspended above the rail and a fluid pressure brake, of mechanism for moving said brake shoe into engagement with the rail, means for subjecting said mechanism to a force tending to move said shoe to the rail upon applying the fluid pressure brakes, a latch device for temporarily preventing the movement of said mechanism when the fluid pressure brakes are applied, and manually operable means for effecting the release of said latch device to permit said mechanism to shift the brake shoe to the rail and for effecting the energization of said shoe.

9. The combination with a magnetic brake and a fluid pressure brake, of a manually operated valve device having one position in which the fluid pressure brakes are applied without applying the magnetic brake and another position in which the magnetic brake is applied.

In testimony whereof I have hereunto set my hand.

CLYDE C. FARMER.